United States Patent
Keal et al.

(10) Patent No.: US 9,683,865 B2
(45) Date of Patent: Jun. 20, 2017

(54) IN-USE AUTOMATIC CALIBRATION METHODOLOGY FOR SENSORS IN MOBILE DEVICES

(71) Applicant: InvenSense, Inc., Sunnyvale, CA (US)

(72) Inventors: William Kerry Keal, Santa Clara, CA (US); Yuan Zheng, Fremont, CA (US); Anjia Gu, Palo Alto, CA (US); James Lim, Saratoga, CA (US); Shang-Hung Lin, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 545 days.

(21) Appl. No.: 13/650,480

(22) Filed: Oct. 12, 2012

(65) Prior Publication Data
US 2013/0197845 A1   Aug. 1, 2013

Related U.S. Application Data

(60) Provisional application No. 61/590,924, filed on Jan. 26, 2012.

(51) Int. Cl.
*G01P 21/00* (2006.01)
*G01C 25/00* (2006.01)

(52) U.S. Cl.
CPC ............ *G01C 25/005* (2013.01); *G01P 21/00* (2013.01)

(58) Field of Classification Search
CPC ...... G01C 21/16; G01C 21/165; G01C 17/38; G01C 19/00; G01C 22/006; G01C 25/005; G06F 2200/1637; G06F 3/0346; G06F 1/1626; A63B 2220/12; A63B 2220/20; A63B 2220/40

USPC ......... 73/1.76, 1.77, 1.75; 702/85, 141, 145, 702/150, 161, 153, 104; 701/472, 500
See application file for complete search history.

(56) References Cited

U.S. PATENT DOCUMENTS

| | | | |
|---|---|---|---|
| 5,808,903 A * | 9/1998 | Schiltz | G01H 1/003 340/683 |
| 6,758,080 B1 | 7/2004 | Ragan et al. | |
| 7,647,195 B1 * | 1/2010 | Kahn | A63F 13/10 702/127 |
| 7,835,879 B2 | 11/2010 | Vocali et al. | |
| 8,676,528 B2 * | 3/2014 | Almalki | G01C 17/28 702/96 |
| 2003/0018430 A1 * | 1/2003 | Ladetto | G01C 21/16 701/472 |

(Continued)

FOREIGN PATENT DOCUMENTS

| WO | WO 00/55652 | 9/2000 |
|---|---|---|
| WO | WO 2008/068542 | 6/2008 |

*Primary Examiner* — John Breene
*Assistant Examiner* — Jeffrey Aiello
(74) *Attorney, Agent, or Firm* — Bay Area Technology Law Group PC

(57) ABSTRACT

A method, system and computer readable medium for calibrating an accelerometer in a portable device is disclosed. The method, system and computer readable medium comprises receiving data from the accelerometer, and providing accelerometer samples from the data based upon one or more selection rules that adaptively selects data that satisfy certain criteria. The method system and computer readable medium also includes fitting the accelerometer samples to a mathematical mode. The method system and computer readable medium further includes providing a bias of the accelerometer based upon a center of the mathematical model.

24 Claims, 16 Drawing Sheets

(56) References Cited

U.S. PATENT DOCUMENTS

| | | |
|---|---|---|
| 2003/0167121 A1 | 9/2003 | Ockerse et al. |
| 2004/0236510 A1 | 11/2004 | Ockerse et al. |
| 2004/0259651 A1* | 12/2004 | Storek ................ A63B 69/3632 473/131 |
| 2005/0174324 A1 | 8/2005 | Liberty et al. |
| 2005/0251328 A1 | 11/2005 | Merwe et al. |
| 2005/0283988 A1 | 12/2005 | Sato et al. |
| 2007/0055468 A1 | 3/2007 | Pylvanainen |
| 2007/0086103 A1 | 4/2007 | Handa |
| 2007/0288166 A1 | 12/2007 | Ockerse et al. |
| 2008/0190202 A1* | 8/2008 | Kulach ............... A63B 24/0062 73/514.01 |
| 2008/0214360 A1* | 9/2008 | Stirling ................ A61B 5/1038 482/9 |
| 2008/0255795 A1 | 10/2008 | Shkolnikov |
| 2009/0070057 A1 | 3/2009 | Hirobe et al. |
| 2009/0089001 A1 | 4/2009 | Lin |
| 2009/0157341 A1 | 6/2009 | Cheung |
| 2009/0254294 A1 | 10/2009 | Dutta |
| 2010/0214216 A1* | 8/2010 | Nasiri ..................... A63F 13/06 345/158 |
| 2010/0292943 A1 | 11/2010 | Minor et al. |
| 2010/0312509 A1 | 12/2010 | Patel et al. |
| 2011/0060543 A1 | 3/2011 | Franke et al. |
| 2011/0077889 A1 | 3/2011 | Vogt |
| 2011/0106477 A1 | 5/2011 | Brunner |
| 2011/0178707 A1* | 7/2011 | Sachs ..................... G01C 17/38 701/472 |
| 2011/0184645 A1* | 7/2011 | Chansarkar ............. G01S 19/26 701/472 |
| 2011/0307213 A1* | 12/2011 | Zhao ...................... G01C 17/30 702/153 |
| 2012/0007713 A1* | 1/2012 | Nasiri ................... G06F 1/1694 340/5.81 |
| 2012/0078570 A1* | 3/2012 | Rothkopf ............... G01C 19/58 702/141 |
| 2012/0203486 A1* | 8/2012 | Almalki ................. G01C 17/28 702/96 |
| 2012/0203487 A1* | 8/2012 | Johnson ................. G01P 21/00 702/104 |
| 2012/0309412 A1* | 12/2012 | MacGougan et al. ..... 455/456.1 |
| 2013/0073142 A1* | 3/2013 | Hergesheimer et al. .... 701/33.1 |
| 2013/0085711 A1* | 4/2013 | Modi ..................... G01C 22/006 702/141 |
| 2013/0110450 A1* | 5/2013 | Kulik ..................... G01C 17/38 702/141 |

* cited by examiner

100

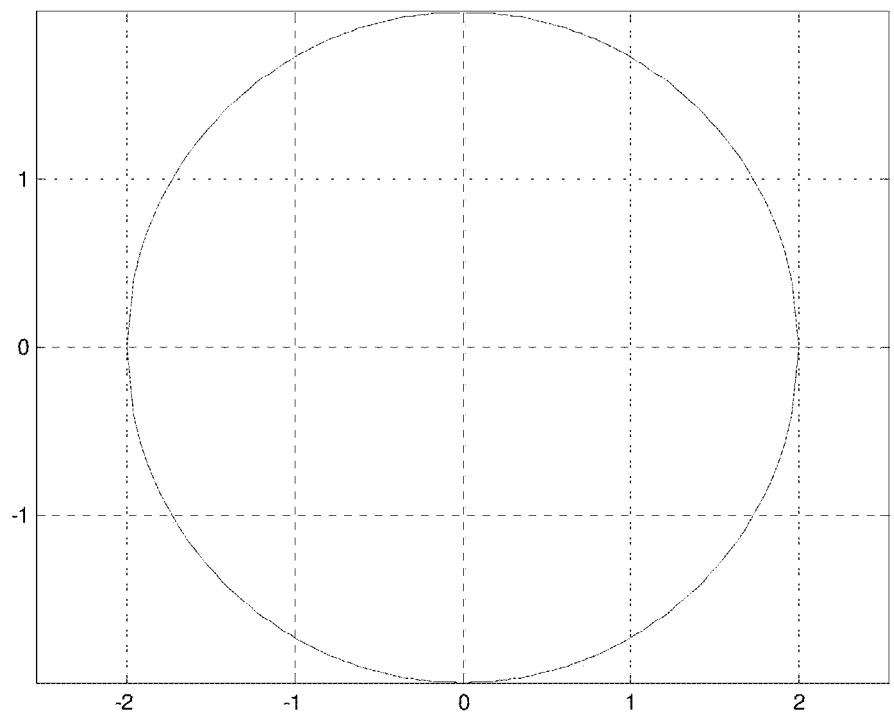
Figure 10B The example grid of 4x4x2 = 32 on x-y plane

IN-USE AUTOMATIC CALIBRATION METHODOLOGY FOR SENSORS IN MOBILE DEVICES

CROSS-REFERENCE TO RELATED APPLICATION

This application claims the benefit under 35 USC 119(e) of U.S. Provisional Patent Application No. 61/590,924, filed on Jan. 26, 2012, entitled "IN-USE AUTOMATIC CALIBRATION METHODOLOGY FOR ACCELEROMETERS (AND/OR MAGNETOMETERS) IN MOBILE DEVICES," which is incorporated herein by reference in its entirety. This application is related to U.S. patent application Ser. No. 13/572,441, filed on Aug. 10, 2012, entitled "MAGNETOMETER BIAS AND ANOMALY DETECTOR," and U.S. patent application Ser. No. 13/164,136, entitled "RAPID SENSOR MOTION DETERMINATION," filed on Jun. 20, 2011, all of which are incorporated herein by reference in their entireties.

FIELD OF THE INVENTION

The present invention relates generally to a calibration methodology for accelerometers and more specifically to an in-use calibration methodology for accelerometers in mobile devices.

BACKGROUND OF THE INVENTION

Due to the nature of electronics and mechanics, MEMS-based accelerometers are prone to having bias (offset) and sensitivity errors. These errors may drift and or change due to temperature, humidity, assembly stress and other changes in peripheral conditions. The inaccurate bias causes problems in sensor fusion, attitude (pitch, roll, and yaw) estimation, heading reference and other parameters that are dependent on the precision of the sensors' outputs. Specifically, if it is required to integrate the raw data, for instance, from acceleration to velocity or from angular rate to angle, the bias drift problem is significantly magnified.

A conventional solution is to calibrate each sensor for each axis for each unit in the factory line. However, this solution adds additional cost because each sensor on the unit has to be calibrated individually. The calibration might also need to change over time due to various reasons such as temperature.

For accelerometers, the conventional solution of calibration is to put the sensor board on a flat, absolutely horizontal table, measure the output of the unit facing upward when it is absolutely still, and then measure it again when facing downward under the same non-movement condition. This is repeated for three different axes. However, in practice, any deviation from these assumptions (flat surface, horizontal table, absolutely no movement) will deteriorate the accuracy of the calibration. In addition, this calibration method is only suitable for lab use or factory calibration. The end user cannot put the portable device, such as a smartphone, tablet, or compatible device on a flat, horizontal table with no movement.

For both MEMS-based accelerometers, the bias drift can be a large percentage of the initial value over the lifetime of the sensor. They vary from the factory calibrated values significantly as time passes by, or as their ambient condition changes, such as temperature.

Accordingly, it is desired is to provide systems and methods for in-use calibration of accelerometers.

SUMMARY OF THE INVENTION

A method, system and computer readable medium for calibrating an accelerometer in a portable device is disclosed. The method, system and computer readable medium comprises receiving data from the accelerometer, and providing accelerometer samples from the data based upon one or more selection rules that adaptively selects data that satisfy certain criteria. The method, system and computer readable medium also includes fitting the accelerometer samples to a mathematical model. The method, system and computer readable medium further includes providing a bias of the accelerometer based upon a center of the mathematical model. The mathematical model includes, but is not limited to, a sphere and an ellipsoid.

A method, system and computer readable medium in accordance with the present invention solves the problem of accelerometer calibration on mobile devices. The method is an in-use calibration process in the background, so that the user does not notice the process when it runs. A method, system and computer readable medium in accordance with the present invention eliminates the need for lab equipment, and for a flat, horizontal and still surface.

BRIEF DESCRIPTION OF THE DRAWINGS

FIG. 10B shows 16 (4×4) grids on the x-y plane of a sphere.

DETAILED DESCRIPTION

Figure 1:
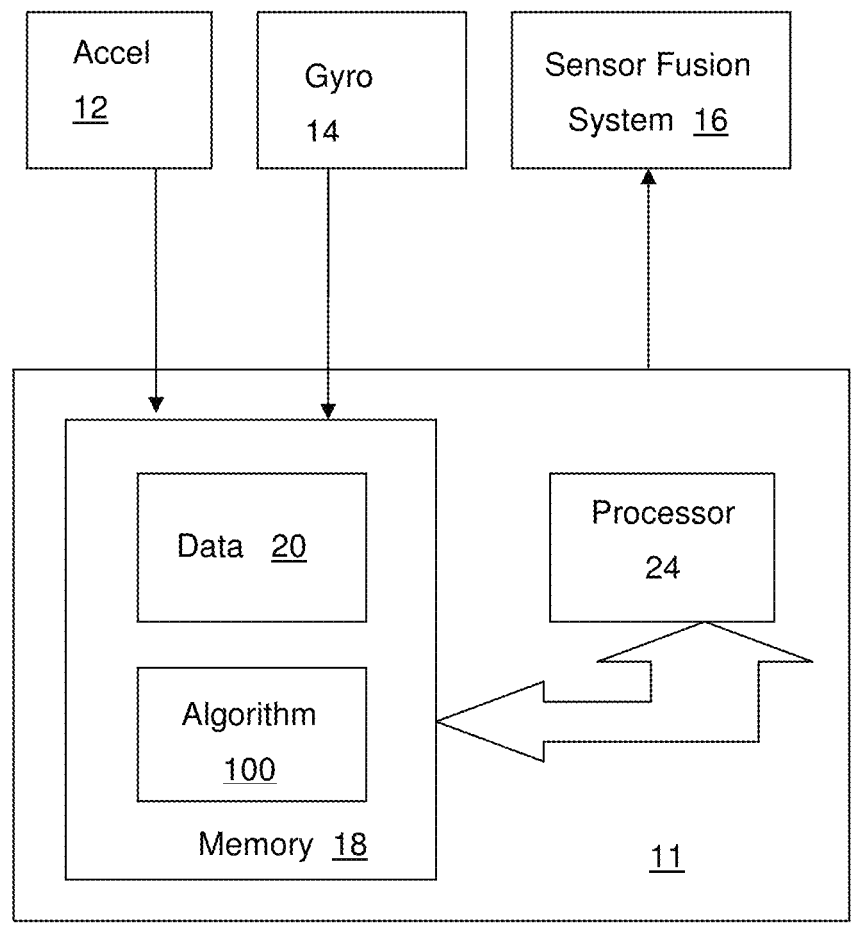
FIG. 1 is a block diagram of a system that utilizes an accelerometer calibration algorithm in accordance with an embodiment.

The described embodiments relates generally to a calibration methodology for accelerometers and more specifically to an in-use calibration methodology for accelerometers in mobile devices. The following description is presented to enable one of ordinary skill in the art to make and use the invention and is provided. Various modifications to the described embodiment and the generic principles and features described herein will be readily apparent to those skilled in the art. Thus, the present invention is not intended to be limited to the embodiments shown, but is to be accorded the widest scope consistent with the principles and features described herein.

Conventional Method for Accelerometer Parameter Calibration

The conventional parameter calibration method for an accelerometer is to isolate the axis measurements and to obtain the accelerometer bias and sensitivity for each axis in three different processes.

First, a sensor board is positioned on the flat table, with Z axis upward. Therefore, all the gravity is on the Z axis, while the X and Y axes do not have gravity components. The following equation is established with this measurement:

$$(\hat{z}_{up} - c) \cdot k_z = -1 \quad \text{Equation 1}$$

Next, the sensor board is flipped, with the Z axis downward. The gravity is also concentrated on Z axis, while the X and Y axes should receive zero gravity.

$$(\hat{z}_{down} - c) \cdot k_z = -1 \quad \text{Equation 2}$$

With the two above equations, the two parameters, c (bias) and $k_z$ (sensitivity on Z axis), are obtained, where $\hat{z}_{up}$ and $\hat{z}_{down}$ are the accelerometer sensor measurement on the 2 different positions.

$$c = \frac{\hat{z}_{up} + \hat{z}_{down}}{2} \quad \text{Equation 3}$$

$$k_z = \frac{2}{\hat{z}_{up} - \hat{z}_{down}} \quad \text{Equation 4}$$

The sensitivity $k_z$ will convert the accelerometer reading to a unit of "g", earth's surface gravity.

The method can be directly applied to X and Y axis in the similar way.

In this method, it is assumed that the position of the sensor board is perfectly controlled so that the gravity falls on one axis at each measurement. In addition, the cross-axis effect is small enough so that the measurement on other axes is zero (or close to zero).

This method only works in theory, in practice however; any deviation from these assumptions will deteriorate the parameter calibration accuracy. In addition, this simple method is only suitable for lab or factory use. It cannot be used by end users. Generally, mobile devices (cell phone, tablet PC, portable electronics) are designed for mobility. Users cannot easily find a place with a flat, horizontal surface with absolutely no movement. In addition, most users would just prefer their device to work well without having to go out of their way to calibrate the device.

A system and method in accordance with the described embodiments solves the problem of accelerometer calibration on mobile devices. Accordingly in-use automatic calibration process in the background is necessary, so that the user does not notice the process when it runs. Accordingly, the need for lab equipment, and for a flat, horizontal and still surface for calibration is eliminated. To describe the features of the present invention in more detail refer now to the following description in conjunction with the accompanying Figures.

FIG. 1 is a block diagram of a system 10 that utilizes an accelerometer calibration algorithm 100 in accordance with an embodiment. The system 10 includes a device 11. The device 11 may include any type of mobile device including but not limited to, a cell phone, a tablet PC, or other type of portable electronic device. The device 11 receives input data from an accelerometer 12. Device 11 could also use sensor data from a gyroscope 14 for improvement in the performance of the algorithm, but it is not required. The device 11 includes a memory for receiving data from the inputs from the sensors 12 and 14. The memory may also, but is not limited to include an accelerometer calibration algorithm 100 in accordance with the described embodiments. A processor 24 executes the algorithm 100 which operates on the data received from the sensors 12. Processor 24 may also operate on data from sensor 14 for improved performance. The processor 24 provides the executed data to a sensor fusion system 16. The sensor fusion system 16 provides the orientation information of the device. In an embodiment, sensor fusion system 16 can reside outside system 11. In another embodiment sensor fusion system can reside inside system 11.

Figure 2:
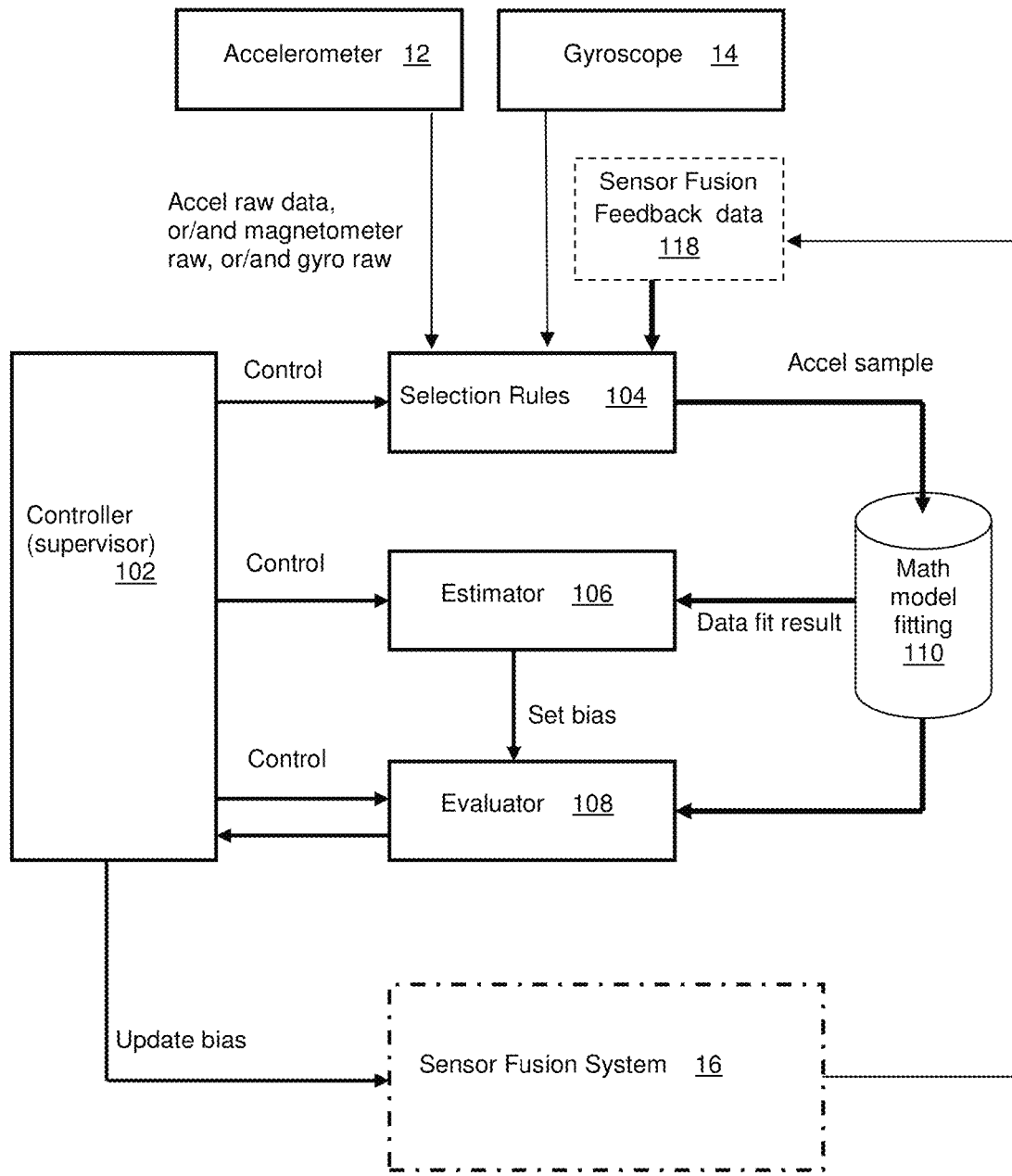
FIG. 2 is a block diagram of an embodiment of the accelerometer calibration algorithm 100.

FIG. 2 is a block diagram of an accelerometer calibration algorithm 100 in accordance with the described embodiments. The accelerometer calibration algorithm 100 comprises a controller (supervisor) 102, which controls the selection rules module 104, the estimator module 106, and the evaluator module 108. A math model fitting module 110 is coupled to the selection rules 104 module, the estimator module 106, and the evaluator module 108. The controller 102 is coupled to the sensor fusion system 16 module 112. In turn, the sensor fusion system module 16 controls a sensor fusion feedback data module 118. A sensor fusion system comprises gyroscope, accelerometers and magnetometers to provide the orientation of a device. The accelerometer 12 and gyroscope 14 provides raw data to the selection rules module 104.

The accelerometer calibration algorithm 100 works seamlessly in real-time as the user uses it on the go. The accelerometer calibration algorithm 100 does not need any lab equipment, nor does it need a flat, horizontal surface with no movement.

A system that utilizes an accelerometer calibration algorithm in accordance with the present invention can take the form of an entirely hardware implementation, an entirely software implementation, or an implementation containing both hardware and software elements. In one implementation, this detection procedure is implemented in software, which includes, but is not limited to, application software, firmware, resident software, microcode, etc.

Furthermore, the accelerometer calibration algorithm can take the form of a computer program product accessible from a computer-usable or computer-readable medium providing program code for use by or in connection with a computer or any instruction execution system. In the described embodiments, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk.

Current examples of optical disks include DVD, compact disk-read-only memory (CD-ROM), and compact disk-read/write (CD-R/W). To describe the features of the present invention in more detail, refer now to the following description in conjunction with the accompanying Figures.

1. Math Model Fitting

The Mathematic Model for 3-Axis Accelerometer Parameter Calibration

During no motion (or n which there is a static case), the 3-axis accelerometer measures the gravity force (1 g), which is distributed into the 3 axis components (X, Y, Z) depending on orientation of the motion sensor. These X, Y, Z measurements satisfy the following equation:

$$\frac{(x-a)^2}{R_a^2} + \frac{(y-b)^2}{R_b^2} + \frac{(z-c)^2}{R_c^2} = 1 \quad \text{Equation 5}$$

In the above equation, the cross-axis effect of accelerometer measurement is not included. In order to include the cross-axis effect, the matrix based quadratic form is used as follows:

$$(A^{-1} \cdot v) \cdot (A^{-1} \cdot v) = 1 \quad \text{Equation 6}$$

where $$v = \begin{bmatrix} x-a \\ y-b \\ z-c \end{bmatrix}$$

is 3-D vector, which contains the bias-free accelerometer measurement data. The matrix $A^{-1}$ is the 3×3 sensitivity matrix.

During motion (or in a dynamic case), the linear acceleration and centrifuge force are added to the gravity force. The acceleration and centrifuge force measurements will serve as distortion to the gravity measurement through the accelerometer.

A special signal processing algorithm is developed to reduce the distortions in gravity measurement. This is the pre-processing logic. With the pre-processing logic, the collected accelerometer data will form the sphere shape or an ellipsoid shape.

With this sphere or ellipsoid model, the accuracy of the estimated parameter can be examined. Only the better parameters from the current learning process are updated to the system. Therefore, from the system point of view, the learned parameters are guaranteed to approach to the true values monotonically.

Due to the measurement and pre-processing error, some distortions can still be included in the gravity measurement. This sphere model can be used to identify the bad sample and an outlier algorithm eliminate it from the model data.

A model-based learning method in accordance with the present invention to avoid the strict requirements for the state-of-the-art accelerometer calibration method is shown. The conventional model for accelerometers is a formula with a bias and a sensitivity parameter, which is called a parameterized model. Then in described embodiments, with enough gravity samples after passing the pre-processing logic, the accelerometer parameters can be fully characterized by the sphere or ellipsoid model. These models can be simply the gravity samples in a well-organized way. The described embodiments show how the gravity data for the model is organized and how the estimated parameters are evaluated. The outlier in the model is pruned so that the model data consistently generates the accurate accelerometer parameters.

The gravity samples with different orientations can form a sphere or ellipsoid. These samples can serve as a model for the accelerometer parameter learning and evaluation. In order to reduce the memory size for this model data, a quantization (or grid) approach is adopted.

This model data can be updated during the life of the motion device. Without involving the user's attention, gravity data with different orientations will be collected and pruned based on the learning algorithm.

There is limited memory usage for this model data. Depending on the accuracy of the parameter estimation, the size of the model can be set. For a current reference design, the maximum samples of 8×8×2=128 for 3-axis gravity data are adopted. Assuming each gravity sample takes six (6) bytes, the memory required for the model is 128×6=768 bytes. The parameter estimation accuracy is below twenty (20) mg. The memory 18 usage is further reduced to achieve the similar accuracy for production.

Figure 3:
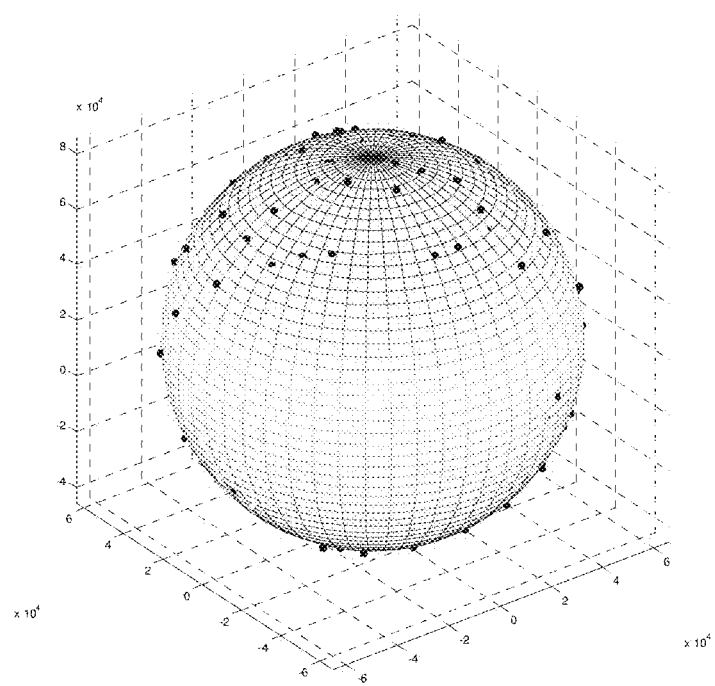
FIG. 3 illustrates an example of a 3-D sphere model fitted to accelerometer data from the movement of a device.
Figure 4:
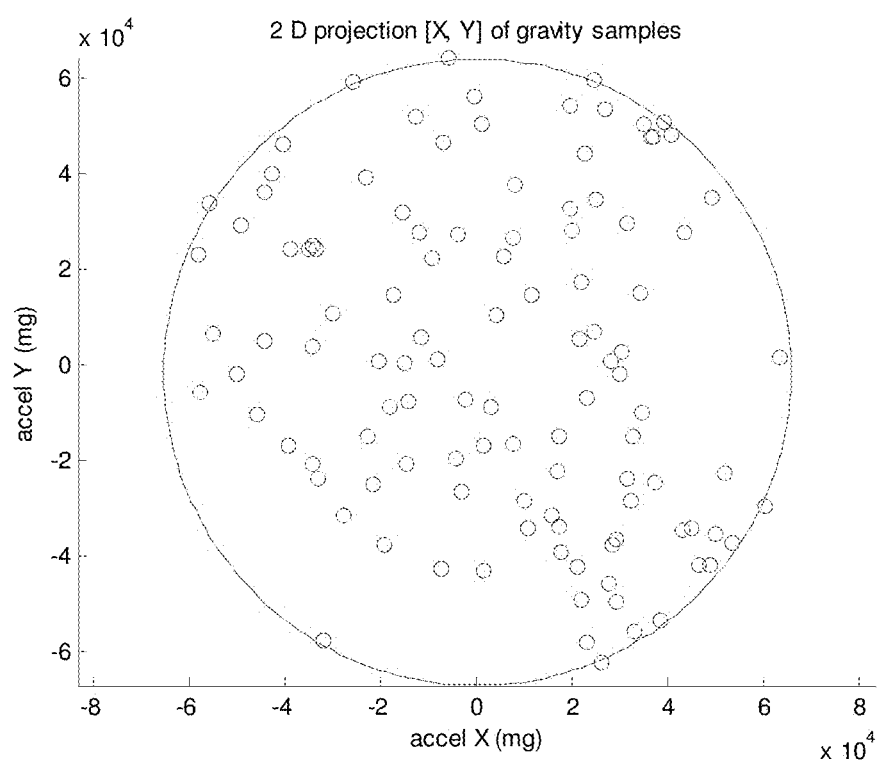
FIG. 4 illustrates an example of the 3-D sphere model of accelerometer data of FIG. 2 projected into an X-Y plane.

FIG. 3 illustrates an example of 3-D sphere model data from the movement of a device. FIG. 4 illustrates an example of the 3-D sphere model data of FIG. 2 projected into an X-Y plane. The purpose of the gravity model data structure is to monitor the gravity data samples in different orientations.

The gravity sample (after the preprocessing of the accelerometer measured data) is a 3-D array. Since the 3-D data forms a sphere, there are actually two degrees of freedom in the gravity sample. Therefore, 2-D mapping is sufficient to store the complete gravity samples in different orientation.

In order to count the gravity sample orientation, a (x, y) mapping method is adopted in this method. For the same (x, y) point, there are two possibilities for z components, positive or negative. If the (x, y) plane is digitized into 8×8 grids, a mapping of (8×8×2) Boolean matrix is needed to count the different orientation.

When a new gravity sample is available in this example, x and y data are digitized into 8 grids and z data is digitized into two grids. The digitized data is compared with the Boolean matrix mapping to check if the gravity model already contains the similar orientation. If the Boolean matrix mapping for that orientation is zero, which means the model does not have this orientation, the gravity sample is stored in the model array and the Boolean matrix is set to one at that orientation. At the same time, the count is incremented by one. The actual memory usage can be reduced by introducing an outlier removal algorithm, so that the number of gravity samples in the model will be limited.

2. Selection Rules

Figure 5:
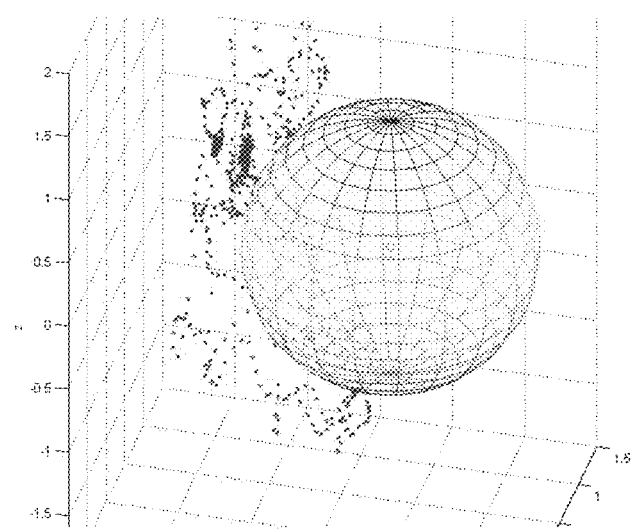
FIG. 5 shows data points of the orientation of the device 11 under normal movement of the device in user's hand

Theoretically, a non-parameterized modeling works perfect if there is no linear acceleration or centripetal acceleration. In reality, MEMS accelerometers are prone to linear acceleration whenever the user moves the device and when the device 11 is not in pure rotational motion, or when centripetal acceleration is introduced once, e.g. the device 11 is not at the pivot of the rotation FIG. 5 shows data points of the orientation of the device 11 under normal movement of the device in user's hand. As is seen much of the data represented by the dots 500 is deviated from the sphere. If these data are plugged in the "non-parameterized model", the results would be totally wrong.

In an embodiment, the sample selection rules are utilized to pick up the "good data" and strictly exclude the "bad data". The Rules include:

(1) Near constant linear acceleration selection rule;
(2) Acceleration Derivative Rule;
(3) Low-motion selection rule; and
(4) Probabilistic selection rule; and
(5) Rotation rate selection rule.

Each of these rules will be described in detail herein below. Once the rules are used to select the points to use, that data set can be used to fit to a shape. Fitting to a shape such as a sphere or an ellipsoid will be described in detail herein below. The fitting described below will show a fit that minimizes the minimum square error between a sphere or ellipsoid and the data set of points. In addition, it is possible to minimize the distance between a point a set of planes created from a normal line created from each two combination of two points and the data set of measurements and the midpoint of that same line. Given N points in a data set, there would be N*(N-1)/2 planes created.

Near Constant Linear Acceleration Selection Rule

Linear acceleration can be calculated by subtracting the estimated gravity from the accelerometer measurements. The estimated gravity can be determined by having an estimate of the orientation. An estimate of the orientation can be made by aggregating data from accelerometers and/or gyroscopes. The orientation of the device can be described using a unit quaternion (also referred to as quaternion) or a rotation matrix. Writing the quaternion the 4 elements of the quaternion with the scalar term first followed by the vector part, linear acceleration can be derived from the quaternion as shown by the following equations when the acceleration ($acc_x$, $acc_y$, $acc_z$) is in g's.

$$\text{quaternion} = \text{quat}(q_0, q_1, q_2, q_3) \quad \text{Equation 7}$$

$$\text{linear acceleration} = \begin{pmatrix} acc_x - 2(q_1 \cdot q_3 - q_0 \cdot q_2) \\ acc_y - 2(q_2 \cdot q_3 + q_0 \cdot q_1) \\ acc_z - 2(q_0 \cdot q_0 + q_3 \cdot q_3) + 1.0 \end{pmatrix} \quad \text{Equation 8}$$

Ideally, if the linear acceleration is zero, then the sample status is static or in purely rotation mode, which is defined as "good data" for the non-parameterized gravity model. However, because of errors on the accelerometers such as bias and sensitivity errors, and errors on the orientation, the linear acceleration is non-zero even when the device is static or just in rotation mode.

A system and method in accordance with the present invention resolves this problem. Even with a large unknown bias in the accelerometer raw data, the zero or nonzero constant output of linear acceleration is an indicator of no linear acceleration. In normal operation, it is not possible to generate long-term constant linear acceleration. Therefore, the near constant linear acceleration selection rule can be used to reject a small set of data samples with linear acceleration.

Acceleration Derivative Rule

Figure 6:
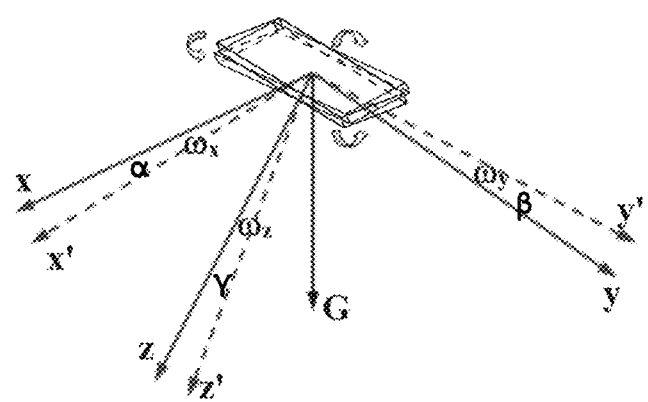
FIG. 6 is a diagram of an embodiment of the motion of a device under a normal movement of a user's hand.

In a pure rotational movement, as shown in FIG. 6, the derivative of accelerometer data is correlated to the rotational rate. As both of accelerometer derivative and the rotational rate can be determined, the motion being purely rotational can be implied if they are equal after scaling and after the transform. A threshold is then utilized to compare the quantities as there is noise and other errors on the measurements. In most cases there will be some linear acceleration and centripetal acceleration when the user is moving the device as small amounts may be acceptable the threshold can be adjusted to accommodate. Often there is an offset when using a gyroscope to measure rotational rate that will also affect selecting the threshold. Optionally the threshold can be adjusted to balance determining the accelerometer bias more accurately versus speed in determining the accelerometer bias.

In this specification, quaternion multiplication is defined in Equation 9 and "*" represents quaternion multiplication.

$$\overline{Q_1} = [q_{1w}, q_{1x}, q_{1y}, q_{1z}]$$

$$\overline{Q_2} = [q_{2w}, q_{2x}, q_{2y}, q_{2z}]$$

$$\overline{Q_1} * \overline{Q_2} = [q_{1w} \cdot q_{2w} - q_{1x} \cdot q_{2x} - q_{1y} \cdot q_{2y} - q_{1z} \cdot q_{2z},$$

$$q_{1w} \cdot q_{2x} + q_{1x} \cdot q_{2w} + q_{1y} \cdot q_{2z} - q_{1z} \cdot q_{2y},$$

$$q_{1w} \cdot q_{2y} - q_{1x} \cdot q_{2z} + q_{1y} \cdot q_{2w} + q_{1z} \cdot q_{2x},$$

$$q_{1w} \cdot q_{2z} + q_{1x} \cdot q_{2y} - q_{1y} \cdot q_{2x} + q_{1z} \cdot q_{2w}] \quad \text{Equation 9}$$

A quaternion inverse is defined in Equation 10 as commonly found in literature.

$$\overline{Q_1}^{-1} = [q_{1w}, -q_{1x}, -q_{1y}, -q_{1z}] \quad \text{Equation 10}$$

The relationship between acceleration derivative and rotational rate can be defined several ways. In one embodiment quaternions will be used. The unit quaternion describes how to rotate a device from the body frame system to the world frame system. Here the body frame is a coordinate frame system fixed to the senor. The world frame is fixed to the surface of the Earth, with one axis parallel to Earth's gravity and the other two orthogonal axes perpendicular to Earth's gravity.

In the world frame gravity would be [0, 0, g], where g is the value for the earth's gravity. Starting with orientation of the device being defined by the quaternion defined in Equation 11 and gravity being defined in the world frame as shown in Equation 12 then gravity in the body frame, using quaternions, would be derived as shown in Equation 13.

$$\text{Quaternion } \overline{Q} = \begin{bmatrix} q_0 \\ q_1 \\ q_2 \\ q_3 \end{bmatrix} \quad \text{Equation 11}$$

$$\overline{G_W} = \begin{bmatrix} 0 \\ 0 \\ 0 \\ g \end{bmatrix} \quad \text{Equation 12}$$

GravityBody: $\overline{G_B} = \overline{Q}^* \overline{G_W} * \overline{Q}$     Equation 13

The rotational rate in quaternion form is defined in Equation 14 with the derivative of a quaternion defined in Equation 15.

$$\text{RotationRate} = w = \begin{bmatrix} 0 \\ w_x \\ w_y \\ w_z \end{bmatrix} \quad \text{Equation 14}$$

-continued $$\frac{dQ}{dt} = \frac{\overline{Q} * \overline{w}}{2}$$ Equation 15

Taking the derivative of $\overline{G_B}$ in Equation 13 and then plugging in the derivative of a quaternion from Equation 15, yields Equation 16.

$$\frac{dG_B}{dt} = \begin{bmatrix} 0 \\ g \cdot \begin{bmatrix} w_y \cdot (-q_0^2 + q_1^2 + q_2^2 - q_3^2) + \\ w_z \cdot (2 \cdot q_0 \cdot q_1 + 2 \cdot q_2 \cdot q_3) \end{bmatrix} \\ g \cdot \begin{bmatrix} w_x \cdot (q_0^2 - q_1^2 - q_2^2 + q_3^2) + \\ w_z \cdot (2 \cdot q_0 \cdot q_2 - 2 \cdot q_1 \cdot q_3) \end{bmatrix} \\ g \cdot \begin{bmatrix} w_x \cdot (-2 \cdot q_0 \cdot q_1 - 2 \cdot q_2 \cdot q_3) + \\ w_y \cdot (-2 \cdot q_0 \cdot q_2 + 2 \cdot q_1 \cdot q_3) \end{bmatrix} \end{bmatrix}$$ Equation 16

The sum of the squares of quaternion elements is 1 as shown in Equation 17.

Unit Quaternion: $1 = q_0^2 + q_1^2 + q_2^2 + q_3^2$ Equation 17

Equation 16 can be simplified using Equation 17 to give Equation 18.

$$\frac{dG_B}{dt} = \begin{bmatrix} 0 \\ g \cdot \begin{bmatrix} w_y \cdot (2 \cdot q_1^2 + 2 \cdot q_2^2 - 1) + \\ w_z \cdot (2 \cdot q_0 \cdot q_1 + 2 \cdot q_2 \cdot q_3) \end{bmatrix} \\ g \cdot \begin{bmatrix} w_x \cdot (2 \cdot q_0^2 + 2 \cdot q_3^2 - 1) + \\ w_z \cdot (2 \cdot q_0 \cdot q_2 - 2 \cdot q_1 \cdot q_3) \end{bmatrix} \\ g \cdot \begin{bmatrix} w_x \cdot (-2 \cdot q_0 \cdot q_1 - 2 \cdot q_2 \cdot q_3) + \\ w_y \cdot (-2 \cdot q_0 \cdot q_2 + 2 \cdot q_1 \cdot q_3) \end{bmatrix} \end{bmatrix}$$ Equation 18

Converting a quaternion into a rotation matrix yields Equation 19.

$$RotationMatrix =$$ Equation 19

$$R = \begin{bmatrix} 2 \cdot q_0^2 + 2 \cdot q_1^2 - 1 & -2 \cdot q_0 \cdot q_3 + 2 \cdot q_1 \cdot q_2 & 2 \cdot q_0 \cdot q_2 + 2 \cdot q_1 \cdot q_3 \\ 2 \cdot q_0 \cdot q_3 + 2 \cdot q_1 \cdot q_2 & 2 \cdot q_0^2 + 2 \cdot q_2^2 - 1 & -2 \cdot q_0 \cdot q_1 + 2 \cdot q_2 \cdot q_3 \\ -2 \cdot q_0 \cdot q_2 + 2 \cdot q_1 \cdot q_3 & 2 \cdot q_0 \cdot q_1 + 2 \cdot q_2 \cdot q_3 & 2 \cdot q_0^2 + 2 \cdot q_3^2 - 1 \end{bmatrix} =$$

$$\begin{bmatrix} r_{0,0} & r_{0,1} & r_{0,2} \\ r_{1,0} & r_{1,1} & r_{1,2} \\ r_{2,0} & r_{2,1} & r_{2,2} \end{bmatrix}$$

Plugging the rotation matrix elements into the derivative of acceleration yields Equation 20, where "x" is the cross product.

$$\frac{dG_B}{dt} = \begin{bmatrix} g \cdot [-w_y \cdot r_{2,2} + w_z \cdot r_{2,1}] \\ g \cdot [w_x \cdot r_{2,2} - w_z \cdot r_{2,0}] \\ g \cdot [w_x \cdot r_{2,1} + w_y \cdot r_{2,0}] \end{bmatrix} =$$ Equation 20

$$g \cdot [r_{2,0} \; r_{2,1} \; r_{2,2}] \times [w_x \; w_y \; w_z]$$

Equation 20 shows the derivative of acceleration is equal to the cross product of the earth's gravity in the frame of the device and angular velocity.

The estimate of the derivative of the accelerometer data is provided by the difference between successive samples and the divide by the time difference. As this estimate is noisy the data can be smoothed by filtering before or after taking the difference. As can be seen, the formula can be derived and manipulated into multiple forms, but the basic idea remains of comparing the derivative of the accelerometer to a function of the rotation rate and orientation. Using a quaternion for the orientation of a device, Equation 18 shows what acceleration derivative should be in a purely rotational state. In another embodiment using a rotation matrix Equation 20 shows what the acceleration derivative should be in a purely rotational rate.

If functions comprising the derivative of the accelerometer, rotation rate and orientation compare within a threshold, the assumption is the accelerometer data can be used in a solution for the solving for the accelerometer bias as the device is in (or close) to a purely rotational motion.

Low-Motion Selection Rule

Another metric to determine when to allow accelerometer data into the solution of fitting accelerometer data to a shape is when a user is not moving or slowly moving the device. Typically if a device is not moving, the sensor data is close to Gaussian. The sensor data could be accelerometer data, gyroscope data, or magnetometer data or derived such as linear acceleration. Typically when calibrating an accelerometer, the accelerometer data would be used, however it is not limited to an accelerometer. An estimate of linear acceleration is also a good choice to use for the low motion metric. To determine if a set of samples is near Gaussian or not, the first four moments of the samples are estimated as shown in Equation 21, Equation 22, Equation 23 and Equation 24, where N is the number of samples to analyze at one time. Third and higher order moments for a Gaussian signal can be derived from the first two moments. Computing the difference between two different methods of computing the third and fourth order moments is shown in Equation 25 and Equation 26 where all the moments are estimated as shown in Equation 21, Equation 22, Equation 23 and Equation 24.

If $V_3V_3$ or $V_4V_4$ is below a threshold, the device is said to be in a slow or no motion state and that set of data is used as part of the solution of fitting accelerometer data to a shape. The threshold can be adjusted to allow the user to hold the device in the hand and/or slightly move or rotate the device. Typically 10 to 25 samples are enough to have a reasonable estimate of $V_3V_3$ and $V_4V_4$ for data rates of 100 Hz or less.

$$T_1 = \frac{1}{N} \sum_{n=0}^{N-1} (x_n)^1$$ Equation 21

-continued $$T_2 = \frac{1}{N}\sum_{n=0}^{N-1}(x_n)^2 \qquad \text{Equation 22}$$

$$T_3 = \frac{1}{N}\sum_{n=0}^{N-1}(x_n)^3 \qquad \text{Equation 23}$$

$$T_4 = \frac{1}{N}\sum_{n=0}^{N-1}(x_n)^4 \qquad \text{Equation 24}$$

$$V_3 = T_3 - 3 \cdot T_2 \cdot T_1 + 2 \cdot T_1^3 \qquad \text{Equation 25}$$

$$V_4 = T_4 - 3 \cdot T_2^2 + 2 \cdot T_1^4 - 4 \cdot V_3 \cdot T_1 \qquad \text{Equation 26}$$

If using linear acceleration as sample data, the linear acceleration can be computed in one embodiment as shown in Equation 8 using quaternion data and accelerometer data, where the accelerometer data is in units of the earth's gravity. In addition to using linear accel with equations Equation 25 and/or Equation 26, the magnitude of linear acceleration, acceleration or magnitude of acceleration can also be used. As Equation 25 and/or Equation 26 are used to find near constant values, a low pass filter could also be used. If the current value compared to a low pass filtered value agreed within a threshold, that piece of data would be added to the data set for shape fitting.

Probabilistic Selection Rule

Figure 7:
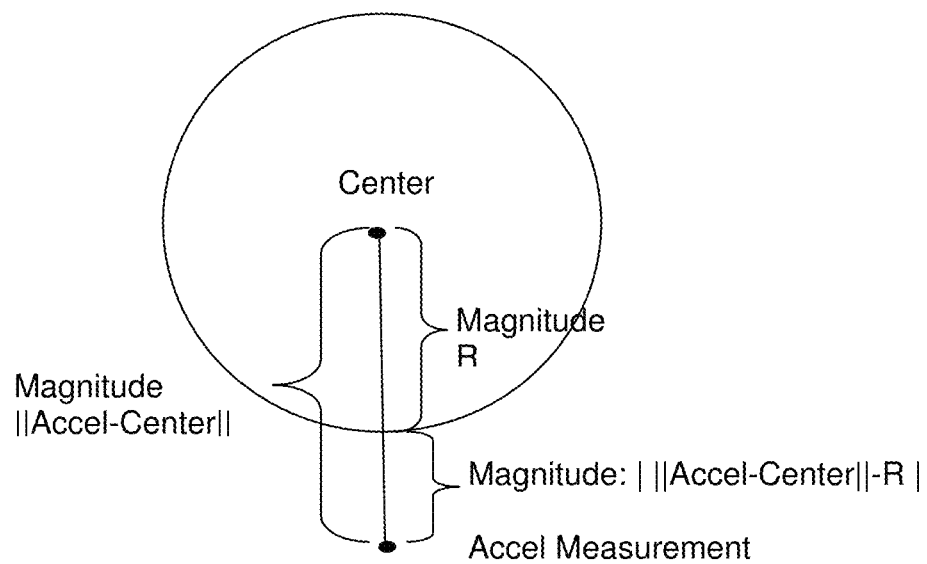
FIG. 7 is a diagram that illustrates the noise on an accelerometer measurement after a sphere model has been fit to the data.

Once there is a good estimate of the shape for fitting accelerometer data to a shape, as shown in FIG. 7, the magnitude squared of the minimum distance from the measurement of accelerometer to the shape can be used to determine if the measurement should be used in further computations of determining the shape. In a purely rotational state, after the accelerometer fitting shape has been solved for, the square of the minimum distance as shown in Equation 27 is approximately equal to the sum of the variance of the accelerometer sensor. In Equation 27, $\overline{\text{Center}}$ is the center of the shape; $\overline{\text{Accel}}$ is the accelerometer measurement; R is the distance from the center of the shape to the surface of the shape; and $\sigma_x^2$, $\sigma_y^2$, $\sigma_z^2$, $\sigma_x^2$, $\sigma_y^2$, $\sigma_z^2$ are the variance of each axis of the accelerometer sensor.

$$(\|\overline{\text{Accel}} - \overline{\text{Center}}\| - R)^2 \approx \sigma_x^2 + \sigma_y^2 + \sigma_z^2 \qquad \text{Equation 27}$$

Note: summing three variances is a Chi Square process of order 3. If the left hand side of Equation 27 is below a threshold, the accelerometer measurement can be used to further improve fitting the accelerometer data to a shape. The threshold can be increased to allow for inaccuracies in the fitting of the shape and small amounts of linear or centripetal acceleration and inaccuracies in estimates of the measurement noise.

Rotation Rate Selection Rule

As large user motions are correlated with user linear or centripetal acceleration, rotation rate can be used as a selection rule. If the rotation rate is below a threshold, then it would be allowed into the data set for fitting a shape. Rotation rate can be determined by gyroscope or by taking the derivative of the orientation quaternion or orientation matrix.

3. Stage-Dependant of Estimation

Figure 12:
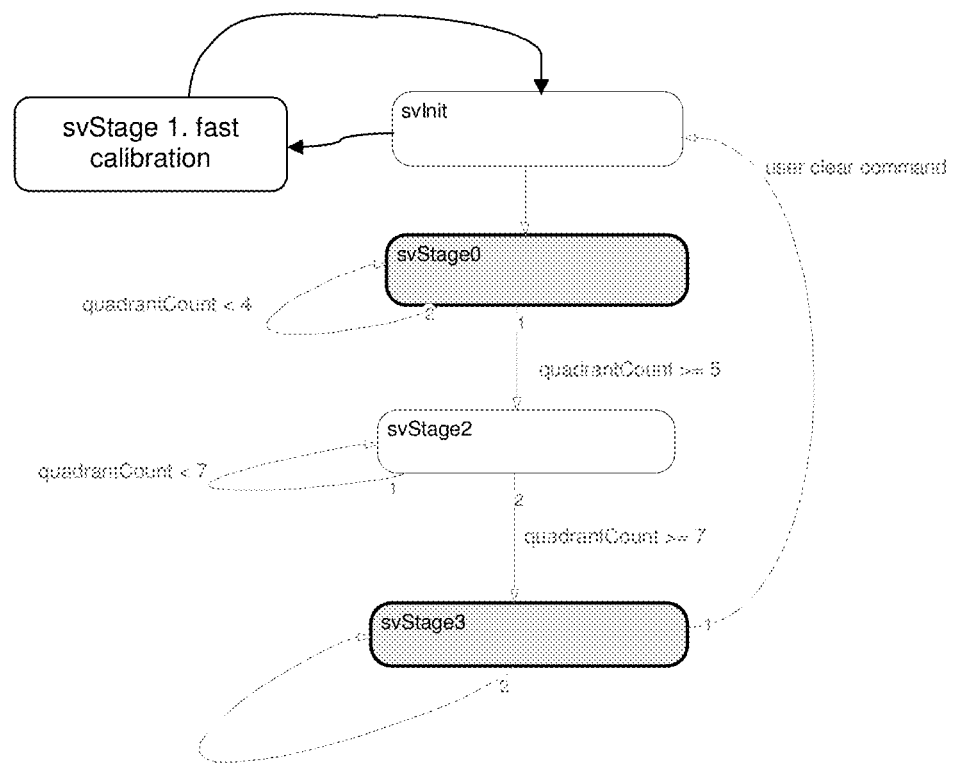
FIG. 12 shows four states in the accelerometer parameter learning supervisor.

In a system and method in accordance with the present invention, there are four stages of learning the orientation of the device, in which different algorithms are used and different levels of sophistication for parameter estimation can be achieved. The four stages are described below, as shown in FIG. 12:

a) Stage 1: fast in-motion express calibration.

This is the user controlled fast in-motion calibration. The user just needs to hold the phone and to do a simple flip (upside-down turn) in 2-4 seconds. There is no lab equipment required, and there is no need for a flat, horizontal and still surface.

b) Stage 0: Sequential single parameter estimation.

This is the entry point for the learning algorithms if fast in-motion express calibration is not good enough by itself. Sequential single parameter estimation is defined as sequentially learning one single axis bias with each available gravity sample. When the gravity component falls in one axis (with at least 80% of the gravity) in a sample, the algorithm can robustly estimate the bias of that axis. During this initial stage, the user needs to hold the sensor device in 3 orthogonal orientations (X-Y-Z) to estimate the bias of the each respective axis sequentially.

c) Stage 2: partial coverage of gravity samples (less than 7 out of 8 quadrants).

With more gravity samples available in the model, the sophisticated sphere algorithm can be used to find the accelerometer bias assuming that the sensitivity of the 3 axis is the same. If the estimated radius (inverse of sensitivity) is closer to 1 g, the estimated bias values are more trustable.

d) Stage 3: full coverage of gravity samples (more than 7 out of 8 quadrants).

With more gravity samples available, the cross-axis sensitivity can be estimated accurately, along with the accelerometer bias and sensitivity. In this stage, the complete set of the accelerometer parameters can be identified reliably. The supervisor state machine stays in this state, in which the outlier algorithm will be running to replace the bad sample with the new gravity sample. In this way, the bias learning is improved with limited memory usage (to hold the gravity samples).

Below is a detailed description of the algorithm:

3.1 Fast In-Motion Express Calibration:

In order to have an accurate bias estimation, all the data points have to pass one or more of the selection rules as stated earlier. However, the more restricted the rules are, the less data points can pass and get collected. It also takes a longer time to complete the full calibration procedure with more selection rules.

Figure 8:
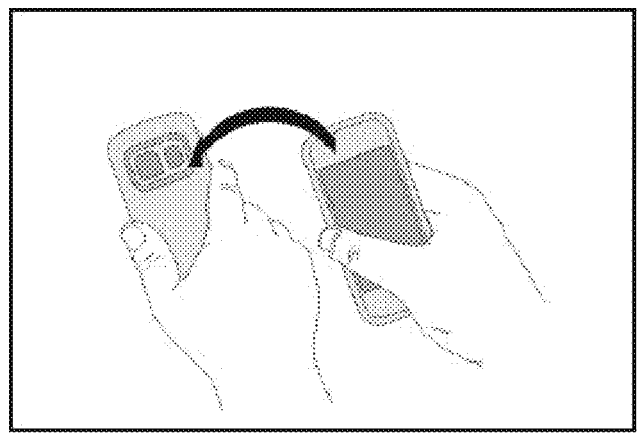
FIG. 8 shows data after a fast flipping of the hand.
Figure 9:
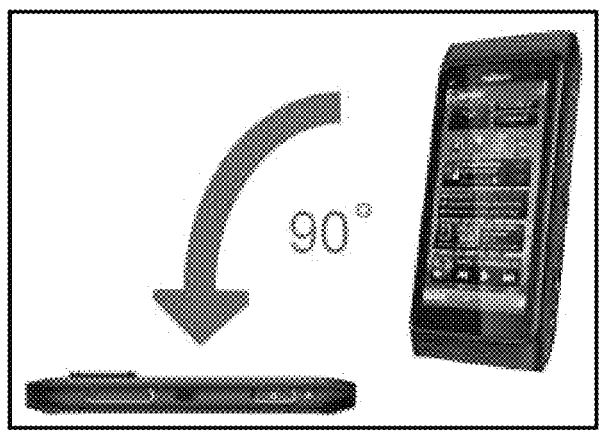
FIG. 9 shows a quick rotation of the phone in 90 degrees.

In some scenarios where the device might go through abrupt temperature change or f a glitch happened at the stored sensor bias data, or strong mechanical shake, the bias is deviated far away from the true value and the user wants to restore the bias immediately. Here the fast in-motion express calibration algorithm in accordance with an embodiment can quickly restore the incorrect bias. As shown in FIG. 8, after a fast flipping of phone in hand (180 degree change), or (FIG. 9) a quick rotation of the phone in 90 degrees, the bias can be restored in 1-4 seconds.

The strategy is with the roughly pre-defined user motion such as in FIG. 8, the rotation moment arm is small. Linear acceleration is limited to a certain amount. Therefore it is possible to obtain about one-half coverage utilizing the motion shown in FIG. 8 and about one fourth the coverage utilizing the motion shown in FIG. 9. Also the error is minimized by applying certain optimization methods. They are described below.

3.2 Sequential Single Parameter Estimation

A single axis bias can be estimated with just one gravity sample in which the gravity falls mostly on the target axis (at least 80%). This sample does not assume the sensor board is put on the flat table. The device can be held by a user stand-still, as long as there is no linear acceleration and in an orientation where the gravity falls on the target axis.

Figure 10A:
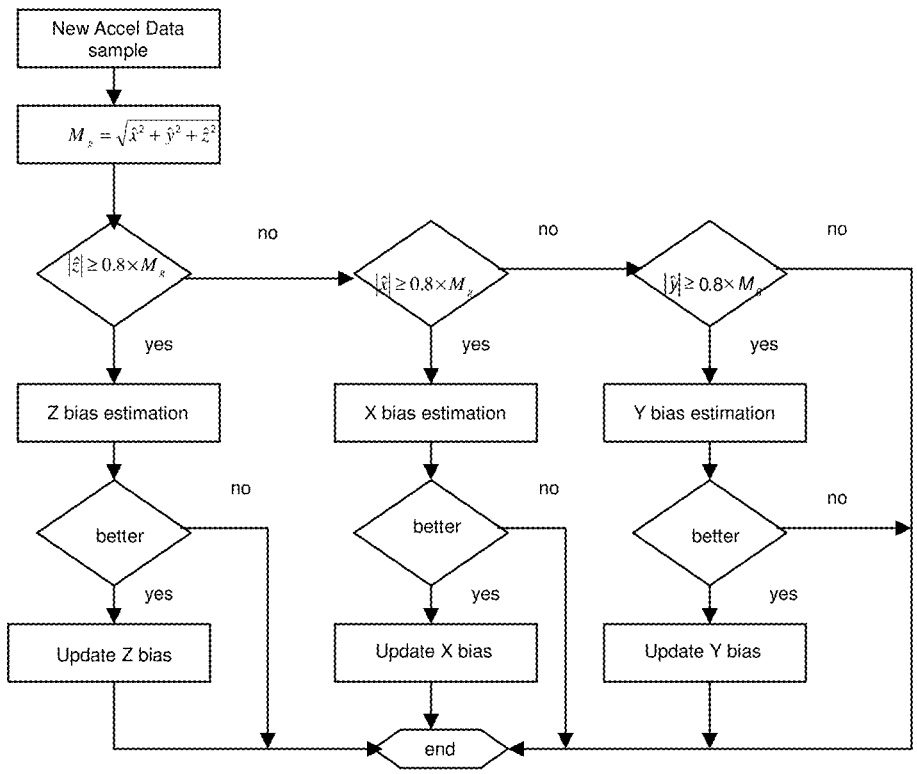
FIG. 10A shows the operating data flow for a single bias estimation algorithm.

The same sphere model is used to estimate the single parameter. That is why only one sample is adequate to solve the equation reliably. The estimation robustness can be improved with more samples (without linear acceleration). The device is held on a user's hand. There are only a few small movements (flat Z upward) during the test. This single bias learning algorithm will run when a new gravity sample is available. The algorithm will check which axis is the target axis (over 80% of gravity). When the target axis is chosen, the estimation algorithm will run on that target axis. FIG. 10A shows the operating data flow for a single bias estimation algorithm. When the new accelerometer data sample (passing the pre-processing logic) is available, this sample is evaluated if any of the axis components dominates (more than 80% of gravity). If not, this sample will not be used to calculate the single axis bias. If yes, the bias of the corresponding axis with the dominating component will be calculated. The FIG. 10A shows the details of the dominating axis detection algorithm.

3.3 Partial Coverage of Gravity Samples (Sphere Least Square Estimation)

In this sphere, in at least one square estimation, the gravity model is described in Equation 28 below, assuming the radius of the three axes are the same. In the quadratic polynomial format, the model is:

$$A(\hat{x}^2+\hat{y}^2+\hat{z}^2)+2G\hat{x}+2H\hat{y}+2I\hat{z}=1 \quad \text{Equation 28}$$

There are only four parameters to estimate from the gravity samples. Each gravity sample will set up an equation. Therefore, the minimum number of samples for this method is four. The more gravity samples, the more accuracy will be achieved by the least square method. The four parameters from the above equation will be converted to the bias and radius through a simple linear formula.

Suppose the bias (or center of the sphere) is $[a,b,c]^T$ and the radius of the sphere is R. The equation of the sphere is:

$$(\hat{x}-a)^2+(\hat{y}-b)^2+(\hat{z}-c)^2=R^2 \quad \text{Equation 29}$$

which can be expanded to $$\hat{x}^2-2a\hat{x}+a^2+\hat{y}^2-2b\hat{y}+b^2+\hat{z}^2-2c\hat{z}+c^2=R^2 \quad \text{Equation 30}$$

$$(\hat{x}^2+\hat{y}^2+\hat{z}^2)-2a\hat{x}-2b\hat{y}-2c\hat{z}=R^2-a^2-b^2-c^2 \quad \text{Equation 31}$$

$$\frac{1}{R^2-a^2-b^2-c^2}(\hat{x}^2+\hat{y}^2+\hat{z}^2)+\frac{-2a}{R^2-a^2-b^2-c^2}\hat{x}+\frac{-2b}{R^2-a^2-b^2-c^2}\hat{y}+\frac{-2c}{R^2-a^2-b^2-c^2}\hat{z}=1 \quad \text{Equation 32}$$

The bias and radius of the sphere can be solved from the following equations:

$$\frac{1}{R^2-a^2-b^2-c^2}=A \quad \text{Equation 33}$$

$$\frac{-2a}{R^2-a^2-b^2-c^2}=2G$$

$$\frac{-2b}{R^2-a^2-b^2-c^2}=2H$$

$$\frac{-2c}{R^2-a^2-b^2-c^2}=2I$$

Simplify the above equation to obtain the following:

$$a=-\frac{G}{A} \quad \text{Equation 34}$$

$$b=-\frac{H}{A}$$

$$c=-\frac{I}{A}$$

$$R=\frac{\sqrt{A+G^2+H^2+I^2}}{A}$$

The gravity samples do not need full coverage of the orientation. The key algorithm is 4×4 matrix inversion. The estimation has tolerance on the noisy gravity samples if there are enough samples.

3.4 Full Coverage of Gravity Samples (Ellipsoid Least Square Estimation)

In this ellipsoid least square estimation, the quadratic matrix model s used. 28. In the quadratic polynomial format, the model is:

$$A\hat{x}^2+B\hat{y}^2+C\hat{z}^2+2D\hat{x}\hat{y}+2E\hat{x}\hat{z}+2F\hat{y}\hat{z}+2G\hat{x}+2H\hat{y}+2I\hat{z}=1 \quad \text{Equation 35}$$

In this example, there are nine parameters to be estimated from the gravity samples. The same least square method is used as that of the sphere model. At least nine gravity samples are required to solve the nine parameters.

The n×9 matrix 0 is formed from the data samples ($[x, y, z]_i^T$):

$$D=[x_i^2 \, y_i^2 \, z_i^2 \, 2x_iy_i \, 2x_iz_i \, 2y_iz_i \, 2x_i \, 2y_i \, 2z_i] \quad \text{Equation 36}$$

The 9×1 vector v is formed from the n×9 matrix D.

$$v=(D^T \cdot D)^{-1} \cdot (D^T \cdot W) \quad \text{Equation 37}$$

where the n×1 vector W is made of 1 in each element. A 4×4 matrix Φ is formulated from v:

$$\Phi = \begin{bmatrix} v(1) & v(4) & v(5) & v(7) \\ v(4) & v(2) & v(6) & v(8) \\ v(5) & v(6) & v(3) & v(9) \\ v(7) & v(8) & v(9) & -1 \end{bmatrix} \quad \text{Equation 38}$$

The center of the ellipsoid (or bias) is obtained through the following equation:

$$B = -\begin{bmatrix} v(1) & v(4) & v(5) \\ v(4) & v(2) & v(6) \\ v(5) & v(6) & v(3) \end{bmatrix}^{-1} \cdot \begin{bmatrix} v(7) \\ v(8) \\ v(9) \end{bmatrix} \quad \text{Equation 39}$$

Another 4×4 matrix is needed to find the transformation matrix A:

$$T = \begin{bmatrix} 1 & 0 & 0 & 0 \\ 0 & 1 & 0 & 0 \\ 0 & 0 & 1 & 0 \\ B(1) & B(2) & B(3) & 1 \end{bmatrix} \quad \text{Equation 40}$$

A new 4×4 matrix is formulated, which will generate the transformation matrix in Equation 43.

$$R = T \cdot \Phi \cdot T^T$$ Equation 41

$$A^{-1} = \frac{-1}{R(4,4)} \begin{bmatrix} R(1,1) & R(1,2) & R(1,3) \\ R(2,1) & R(2,2) & R(2,3) \\ R(3,1) & R(3,2) & R(3,3) \end{bmatrix}$$

The formula to convert the nine coefficients into the estimated parameters can be provided in a variety of ways, most commonly by minimizing the square error of Equation 35 (Least square method). A method typically requires the full coverage of the gravity samples with enough sample numbers to provide accurate parameter estimation. In one embodiment, the minimum number of gravity samples to obtain accurate bias calculation is 25 distributed in all eight quadrants.

4. Estimation Evaluator and Outlier Eliminator

The gravity model data can be used to evaluate the accuracy of the estimated parameters.

The sample space is a spherical space gridded into $2^n$ equal distance grids. For example, 32 grids can be defined on a spherical surface. Then on the x-y plane, there will be 16 (4×4) grids, which is shown in FIG. 10B. Each grid will only allow one data sample.

When the grid sample space in the gravity model data is large enough (for example more than 75%, or more than 24 grids out of 32 grids are filled with samples), the evaluation tool is used to select the best data for any filled grid. The actual execution logic of the outlier eliminator algorithm will be explained herein below.

The outlier data is the sample in the sample space, which deviates from the rest of the samples by some evaluation rule. Before there are enough filled grids, there will be no reliable outlier remove logic available. Therefore, the new sample data on the filled grid has to be discarded.

All the parameters are evaluated for each gravity sample in the right hand side of Equation 42 below.

The value of each evaluation in Equation 42 should be close to gravity (or 1 g).

After the new sample data is identified for the filled grid when the number of the filled data is larger enough, the spherical radius will be evaluated with this new sample and the current sample in the target grid. The sample with evaluated radius close to 1 g will stay in the grid, while the other sample will be discarded (the outlier).

The Euclidean distance from the sample to the estimated bias is calculated as following to serve as radius measure:

$$r = \sqrt{(x-a)^2 + (y-b)^2 + (z+c)^2}$$ Equation 42 where (x, y, z) is the sample in the sphere model and (a, b, c) is estimated bias.

If the cross-axis sensitivity is considered, the matrix quadric model needs to be used to calculate the Euclidean distance as illustrated by Equation 43 below.

$$r = \sqrt{(A^{-1} \cdot v)^T \cdot (A^{-1} \cdot v)}$$ Equation 43

The above model can also be used to evaluate the confidence level for the parameter estimation.

The estimated parameters and the currently employed parameters can be compared with the current gravity sample data. The radius in the above model is calculated for each gravity samples in the filled grids with the target parameters. Then the standard deviation is calculated. If the newly estimated parameters have lower standard deviation in radius than that of the current parameters, the new parameters will replace the current parameters.

Figure 11:
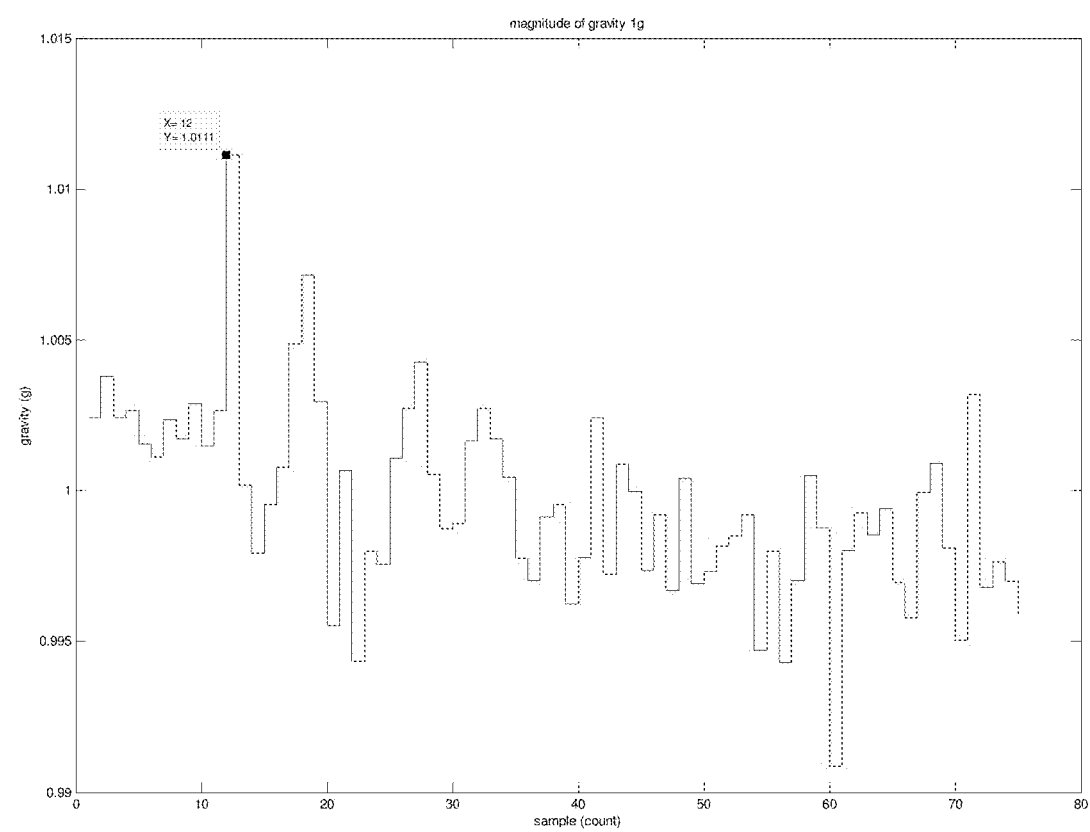
FIG. 11 shows a plot of distance of all samples from the estimated bias.

One example is plotted in FIG. 11. FIG. 11 shows a plot of distance of all samples from the estimated bias. The 12th sample is the worst data in the same grid as the $11^{th}$ sample, which is removed by the outlier algorithm.

5. Intelligent Supervisor

In this section, the function of the controller 102 (FIG. 2) is described in more detail. The controller 102 controls the selection rules 104, the o estimator 106 and the evaluator 108. The detailed functional explanation for the three functional modules 104, 106 and 108 is provided in each respective section.

The parameter learning is a sequential process, which can be modeled as a finite state machine.

The state transition is driven by the coverage measure of the gravity sample. The whole sphere of the gravity sample space is divided into eight (8) quadrants. When the gravity samples fills into new quadrant, the quadrant counter will be incremented.

The quadrant count will start from zero, and then will count up to 8.

FIG. 12 illustrates an embodiment of an implementation of a state machine of controller 102.

1) svInit: The initial state, which initializes all the data structure for the algorithm.

2) svStage1: fast in-motion calibration. The fast in-motion calibration calibrates accelerometer bias in a predefined gesture: an upside-down turn in 1-3 seconds.

3) svStage2: the single axis bias estimation stage. When the gravity falls in one axis (more than 80% of gravity), that axis becomes the target axis for the bias estimation. If the gravity coverage is more than four quadrants, the state is transited to the svStage3.

4) svStage3: the sphere least square method will be used to estimate the 3 axis bias and the radius, assuming the 3 axes shares the radius. If the estimated radius is close to gravity, the estimated bias will have high confidence. If the gravity coverage reaches to seven quadrants, the state is transited to svStage3.

5) svStage4: the ellipsoid least square method will be used to estimate the full set accelerometer parameters. The state will stay in this state until the user clears all the gravity samples to start over from the initial state.

6. Progressive Learning System

The sphere model data are built along the use of the motion sensor device gradually. The model data building processing is an important part of the learning process.

The gravity counter monitors the gravity sample coverage in grid level. In an example, a grid of 8×8 is defined for X-Y plane. If there is already a gravity sample in the same grid, the logic with gravity counter will not accept new sample within the same grid.

The quadrant counter works in the same way as the gravity counter. The whole sphere is divided into eight equal sub-spaces by the 3 orthogonal axis planes. The quadrant counter logic will monitor which quadrant has the gravity samples.

When each estimated parameter is available, an evaluation routine in evaluator 108 is used to compare this estimation with the one currently used in the sensor fusion system 16 (FIG. 1). If the new estimation has a better score, the new estimated parameters will be put in the system to replace the current one.

Generally, the learning accuracy is increased with more data (or more experience in the human learning behavior terminology). However, there is no guarantee that the learning algorithm will always generate the accurate parameter estimation. A good evaluation tool is contained in this invention to monitor the accuracy of the current estimation. Using this evaluation tool, the accuracy of the estimated parameters can be compared with those employed in the motion sensor fusion system.

If the current estimation is worse than the currently employed one, this estimation will be discarded.

If the current estimation is better than the currently employed one, this estimation will be updated to the motion sensor fusion system.

In this way, the robustness of the learning is guaranteed even with some bad data in the gravity model.

Figure 13:
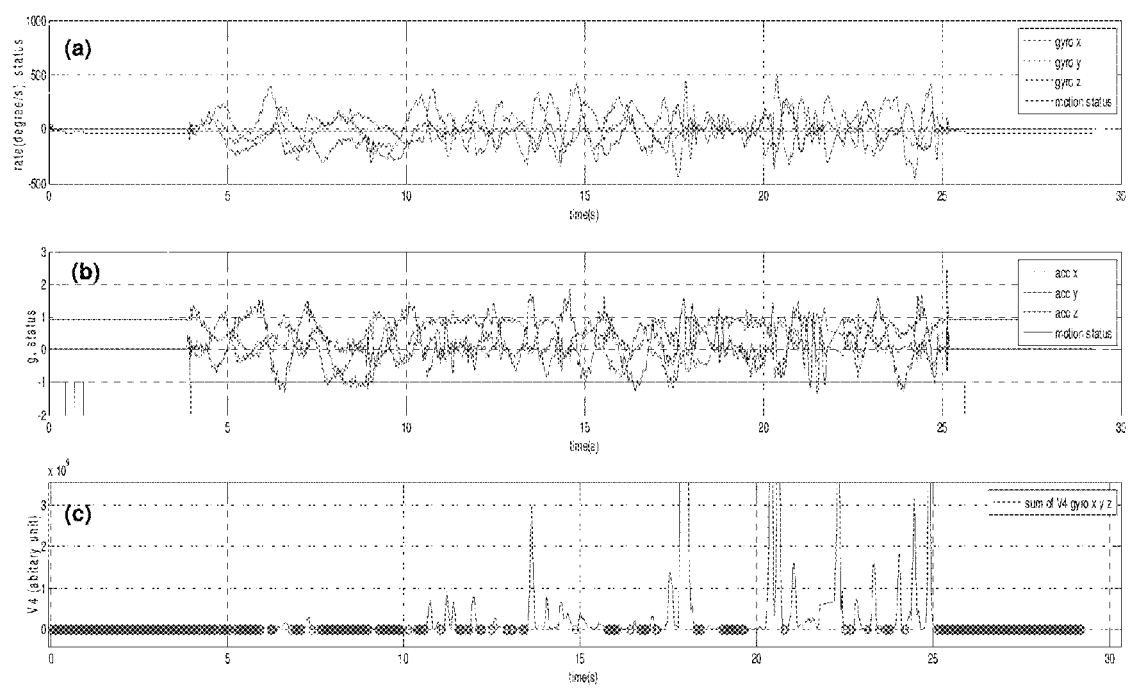
FIG. 13 shows a sample selection rule to reject linear acceleration and centripetal acceleration.
Figure 14:
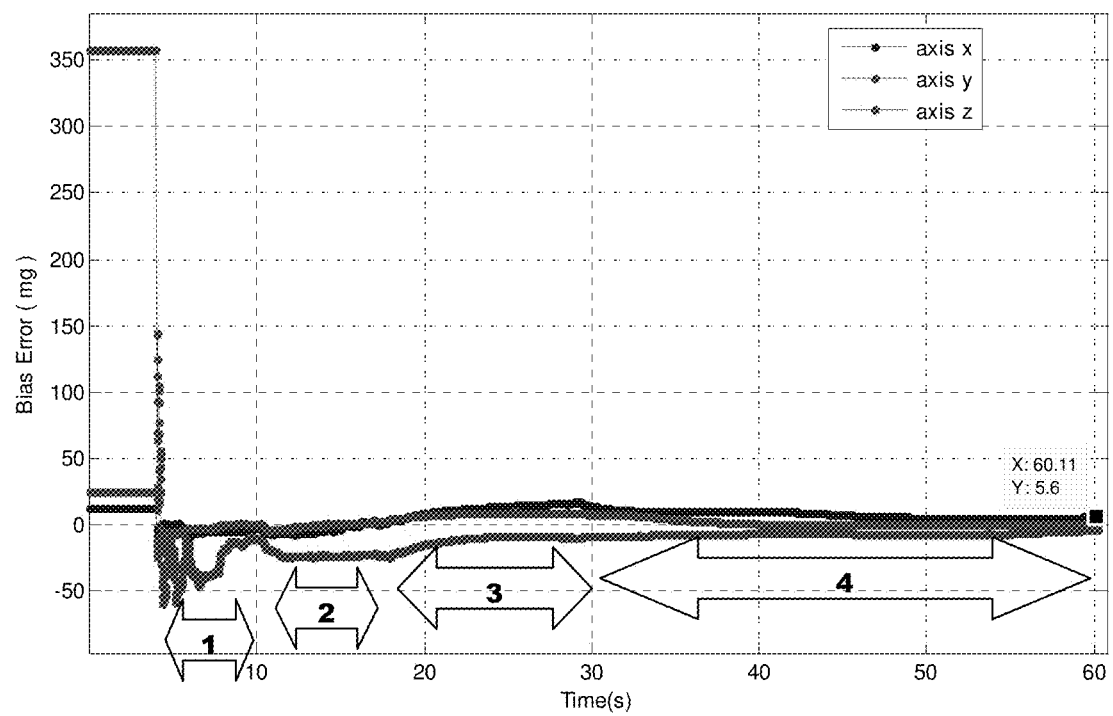
FIG. 14 shows a typical flow of four stages in an in-use automatic calibration.

FIG. 13a-13c shows a typical sample selection rule to reject linear acceleration and centripetal acceleration FIGS. 13a and 13(b) are gyroscope and accelerometer output while the user plays with the phone in random movements. FIG. 14 shows how the selection rules work: the data points with the "good data" that having passed the selection rules.

FIG. 14 shows a typical flow of four stages in an in-use automatic calibration.

Figure 15:
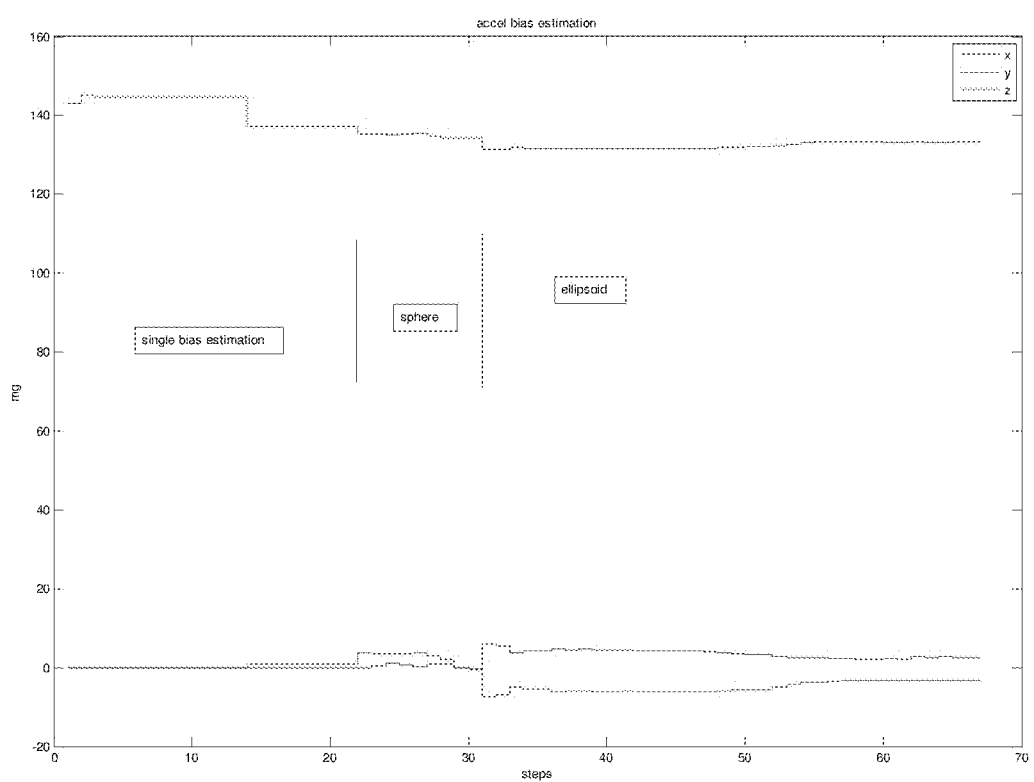
FIG. 15 shows the accelerometer bias estimation at different stages.

FIG. 15 shows the accelerometer bias estimation at different stages.

1) At Stage 2, the Z bias is estimated with high accuracy, while the X and Y axes do not trigger the estimation because the majority of the gravity falls on Z axis during this stage. At the $13^{th}$ gravity sample, the Y axis becomes the target axis and its bias is estimated.

2) At Stage 3, the sphere least square method is triggered, which can deliver bias estimation with high accuracy if the three axes' sensitivity are the same. For this accelerometer, the sensitivities of the three axes are slightly different, which prevent the sphere algorithm to achieve enough accuracy. Since there is 2% sensitivity variations in this device, the sphere method cannot provide accurate bias estimation. Therefore, when the ellipsoid method is triggered, a bump up in bias estimation is provided.

3) At Stage 4, when there is enough gravity coverage, the ellipsoid least square method is triggered. This method delivers the full set of accelerometer parameters with extremely high accuracy.

The advantages of the present invention are:

1. Provides in-use automatic calibration methodology for both accelerometer and magnetometers. There is no lab equipment needed, and it is also not necessary to have a flat horizontal and still surface. The algorithm calculates the bias automatically as the user uses the device on-the-go.

2. Provides a very fast initial calibration, and it eventually converges.

3. Provides a progressive learning methodology that can learn from the user's behavior and adapt to ambient conditions (such as temperature, humidity, assembling stress, magnetic interference, etc.)

4. Calculates the bias in very high precision. As one of the embodiments, it can reach 5 milli G (0.5% of gravity) for consumer grade accelerometers.

5. Covers not only bias, but also sensitivity and cross-axis sensitivity, which can be calculated in stage 4, which is full coverage calibration.

6. Consists of an intelligent first-principle and probabilistic filters to reject the undesirable data, e.g., as for accelerometers, the filter can automatically reject unwanted linear/centripetal acceleration; as for magnetometers, it can reject the unpredicted magnetic interference.

7. Provides a supervisory agent to monitor the accuracy and confidence level of the calibration, and the bias can be updated if the current bias from calculation is better than previous bias; or it may discards the bias if the current bias from calculation is worse the previous bias.

8. Constantly monitors all the parameters (bias, sensitivity and cross-axis sensitivity) of accelerometers and magnetometers, and stores it on memory for the next power-on initialization.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of calibrating an accelerometer in a portable device comprising:
receiving data from the accelerometer;
providing accelerometer samples from the data based upon one or more selection rules that adaptively selects data that satisfy certain criteria; wherein the selection rules includes a rule wherein a variation of the linear acceleration is below a threshold to select a small set of accelerometer samples at a plurality of orientations;
fitting the small set of accelerometer samples to a mathematical model to facilitate learning a bias of the accelerometer; and
providing the bias based upon a center of the mathematical model;
wherein the bias is calculated automatically as a user uses the portable device.

2. The method of claim 1, further comprising receiving data from a gyroscope.

3. The method of claim 1, where the mathematical model is a sphere.

4. The method of claim 1, where the mathematical model is an ellipsoid.

5. The method of claim 4, where the stretch of each axis of the ellipsoid is equivalent of scaling of the corresponding axis.

6. The method of claim 1, wherein the selection rules select a subset of the data to provide the accelerometer samples.

7. The method of claim 2, wherein the selection rules include an in-motion selection rule wherein the derivative of acceleration is a function of the gyroscope and orientation of the device.

8. The method of claim 1, wherein the selection rules includes variation of the linear acceleration is below a threshold.

9. The method of claim 2, wherein the selection rules includes a rotation rate of the device.

10. The method of claim 9, the rotation rate is determined from the gyroscope or quaternion derivative.

11. The method of claim 2, where the gyroscope data is used to determine whether the device is substantially steady.

12. The method of claim 1, wherein the portable device is held substantially steady.

13. The method of claim 1, where the selection rules includes, utilizing a least square method to estimate a three axis bias and a radius of a sphere if three axes share the same radius.

14. The method of claim 1, further comprising storing information related to the accelerometer samples.

15. The method of claim 12, the information includes statistical features.

16. The method of claim 12, the information includes 2.sup.nd, 3.sup.rd and 4th order of the data.

17. The method of claim 1, further comprising erasing the stored information when the linear acceleration is above a threshold value and the portable device is substantially steady.

18. The method of claim 1, further comprising selecting an axis for providing the bias.

19. The method of claim 16, further the selecting an axis includes selecting a first axis when magnitude of data along the first axis is greater than magnitude of accelerometer data multiplied by a threshold, where in the magnitude of the accelerometer data square is sum of the square of the data along the first axis, second axis and the third axis.

20. The method of claim 17, selecting a second axis when the magnitude of the data along the first axis is lesser than the magnitude of the data vector multiplied by the threshold, and when the magnitude of data along the second axis is greater than the magnitude of the data vector multiplied by a threshold.

21. The method of claim 15, selecting a third axis when the magnitude of the data along the second axis is lesser than the magnitude of the data vector multiplied by a threshold, and when the magnitude of the data along the third axis is greater than the magnitude of the vector multiplied by a threshold.

22. The method of claim 1, wherein second data related to the second axis and a third data value related to third axis are small, bias of the first axis is set to the difference of 1 and the first data along the first axis.

23. The method of claim 1, where in selecting an axis includes sensing a rotation of the device above a third threshold angle.

24. A non-transitory computer program product stored on a computer readable medium, comprising: computer readable program means for causing a computer to control an execution of an application to perform a method for calibrating an accelerometer in a portable device comprising:

receiving data from the accelerometer;

providing accelerometer samples from the data based upon one or more selection rules that adaptively selects data that satisfy certain criteria;

wherein the selection rules includes a rule wherein a variation of the linear acceleration is below a threshold to select a small set of accelerometer samples at a plurality of orientations;

fitting the small set of accelerometer samples to a mathematical model to facilitate learning a bias of the accelerometer; and providing the bias of the accelerometer based samples upon a center of the mathematical model; wherein the bias is calculated automatically as a user uses the portable device.

* * * * *